United States Patent [19]

Washizu

[11] Patent Number: 4,800,109
[45] Date of Patent: Jan. 24, 1989

[54] FLEXIBLE COMPOSITE HOSE

[75] Inventor: Katsushi Washizu, Sunto

[73] Assignee: Usui Kokusai Sangyo Kabuskiki Kaisha, Shizuoka Prefecture Japan

[21] Appl. No.: 9,471

[22] Filed: Feb. 2, 1987

[30] Foreign Application Priority Data

Feb. 1, 1986 [JP] Japan .......................... 61-13909[U]

[51] Int. Cl.[4] ............................. F16L 11/00
[52] U.S. Cl. ............................ 428/34.9; 138/137; 138/141; 428/421; 428/422; 428/475.5; 428/475.8; 428/476.3
[58] Field of Search .................. 156/84; 138/137, 140, 138/141; 428/36, 421, 422, 475.5, 475.8, 476.3

[56] References Cited

U.S. PATENT DOCUMENTS

| | | | |
|---|---|---|---|
| 3,944,453 | 3/1976 | Chudgar et al. | 138/137 |
| 3,994,726 | 11/1976 | Wales | 156/84 |
| 4,035,534 | 7/1977 | Nyberg | 156/84 |
| 4,206,786 | 6/1980 | Wetmore | 138/137 |
| 4,207,364 | 6/1980 | Nyberg | 156/84 |
| 4,522,852 | 6/1985 | Dunn | 138/137 |
| 4,555,422 | 11/1985 | Nakamura et al. | 428/36 |
| 4,606,952 | 8/1986 | Sugimoto et al. | 428/36 |
| 4,613,532 | 9/1986 | Michel et al. | 428/36 |
| 4,633,912 | 1/1987 | Pilkington | 138/137 |
| 4,636,346 | 1/1987 | Gold et al. | 156/248 |

Primary Examiner—Ellis P. Robinson
Assistant Examiner—James J. Seidleck
Attorney, Agent, or Firm—Anthony J. Casella; Gerald E. Hespos

[57] ABSTRACT

There is provided a flexible composite hose constructed such that a plastics inner tube is covered with an outer tube of heat-shrinkable material, with the inner tube being compressed by the shrinkage force of the outer tube. It is produced by covering an inner tube with an outer tube having a slightly larger inside diameter than the outside diameter of the inner tube, and then heating the tube assembly at a proper temperature to effect heat shrinkage. It has good chemical resistance and pressure resistance.

3 Claims, 1 Drawing Sheet

FLEXIBLE COMPOSITE HOSE

BACKGROUND OF THE INVENTION

1. Field of the Invention

The present invention relates to a plastics flexible composite hose of improved structure, especially the one having a comparatively small diameter less than about 20 mm. It has good oil resistance, chemical resistance, and pressure resistance, and it is characterized by its ability to resist the attack by fluids flowing inside thereof and a variety of substances that come into contact with the outside thereof. Because of these features, the flexible composite hose of the present invention will find use as a means to feed oil, gas, and chemical solutions in a large variety of machines and equipment including automobiles.

2. Description of the Prior Art

The conventional flexible composite hose of the type to which the present invention pertains has a structure as shown in FIG. 4. It is made up of a comparatively thin-walled inner tube 11 of polyamide resin (such as nylon) or fluoroplastics (such as polytetrafluoroethylene known as "Teflon"), an adhesive tape 13 spirally wound round the outside 11' of the inner tube 11, a braid reinforcement 14 of fabric or net covering the adhesive tape 13, and an outer tube 12 formed by injection from a molten plastics material.

The conventional flexible composite hose of the above-mentioned structure has disadvantages. The winding of the adhesive tape 13, the covering with the brain reinforcement 14, and the forming of the outer tube 12 by injection require a large-scale apparatus and complex operations, which inevitably leads to high production cost.

SUMMARY OF THE INVENTION

It is an object of the present invention to provide a flexible composite hose which can be made very easily at a low cost without loss of oil resistance, chemical resistance, and pressure resistance.

In order to overcome the above-mentioned disadvantages, the present inventors carried out a series of researches which led to the finding that the above-mentioned objective can be achieved with a hose made up of an inner tube and an outer tube of heat-shrinkable material. In other words, the present invention provides a flexible composite hose constructed such that a plastics inner tube is covered with an outer tube of heat-shrinkable material, with the inner tube being compressed by the shrinkage force of the outer tube.

DETAILED DESCRIPTION OF THE INVENTION

According to the invention, the inner tube is made of a synthetic resin having flexibility and high oil resistance, chemical resistance, and pressure resistance. It includes, for example, polyamide resins and fluoroplastics. Examples of the former include nylon-11 (e.g., "Rilsan"), nylon-12 (e.g., "Daiamid" and "Grilamid"), and nylon-6 (e.g., "Amilan"); and examples of the latter include polytetrafluoroethylene (e.g., "Teflon TFE"), tetrafluoroethylene-hexafluoropropylene copolymer (e.g., "Neoflon FEP"), and tetrafluoroethylene-perfluoroalkoxyethylene copolymer (e.g., "Teflon PFA"), which are commercially available. The inner tube may have a comparatively thin wall thickness and any length desired.

The outer tube is made of a heat-shrinkable synthetic resin. Upon heating, it shrinks in the radial direction at a ratio of from 1.3:1 to 4:1 and it shrinks in the lengthwise direction by 5% to 10%. As with the inner tube, it should preferably be made of a material having flexibility and high oil resistance, chemical resistance, and pressure resistance. Examples of such a material include crosslinked polyolefins, fluoroplastics, and synthetic rubbers. The last is desirable where the hose is required to have flexibility, resilience, recovery from deformation, flex cracking resistance, and abrasion resistance.

The crosslinked polyolefin is one which has the three-dimensional network structure of polymer molecules. It is produced by irradiating a polyolefin with high energy electron rays. It is commercially available under the trade name of "Penntube", "Insultite", "Thermofit Tube", and "Sumitube".

Examples of heat-shrinkable fluoroplastics include polytetrafluoroethylene (e.g., "Teflon TFE"), tetrafluoroethylene-hexafluoropropylene copolymer, polytetrafluoroethylene having perfluoroalkoxy groups, ethylene-tetrafluoroethylene copolymer, and polyvinylidene fluoride. Heat-shrinkable tubes made of them are commercially available under the trade name of, for example, "Penntube".

Examples of heat-shrinkable synthetic rubbers include chloroprene rubber (e.g., "Neoprene") and crosslinked fluororubber (e.g., "Viton"). Heat-shrinkable tubes made of them are commercially available under the trade name of, for exmaple, "Insultite".

Figure 1:
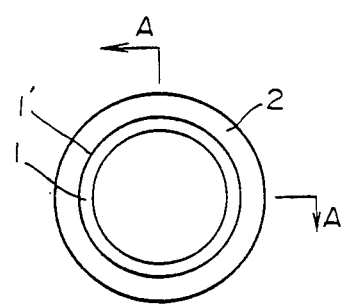
FIG. 1 is a sectional view of the flexible composite hose of the invention.

The flexible composite hose of the invention is produced by the following steps. First, the inner tube 1 having a comparatively thin wall (as shown in FIG. 1) is produced from an appropriate material selected according to the intended application. Then, the inner tube is covered with the outer tube having an inside diameter slightly larger than the outside diameter of the inner tube 1. The material for the outer tube is properly selected according to the intended application. Finally, the resulting double-walled tube assembly is passed through an electric furnace at a speed of 0.5 to 1 m/min, while being kept straight. The electric furnace is heated to a temperature at which the outer tube 2 shrinks as desired. The heat shrinkage causes the outer tube 2 to apply compressive force to the inner tube 1.

Figure 3:
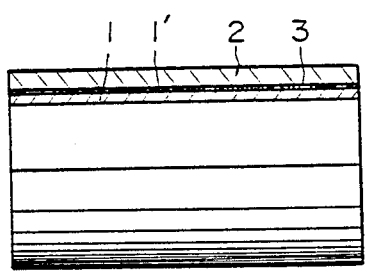
FIG. 3 is a longitudinal sectional view, equivalent to FIG. 2, of another embodiment.
Figure 4:
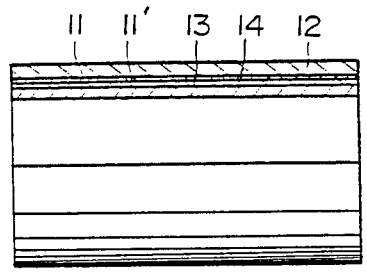
FIG. 4 is a longitudinal sectional view, equivalent to FIG. 2, of a conventional flexible composite hose.

In an alternative embodiment, an adhesive 3 may be interposed between the inner tube 1 and the outer tube 2 as shown in FIG. 3. The adhesive may be previously applied to the outside 1' of the inner tube 1 by a proper means. It is also possible to use an outer tube with its inside previously coated with a fusible liner or hot-melt adhesive. Examples of the adhesive include polyamide adhesives and polyvinyl acetate adhesives which are commonly used for the production of composite hose of the type to which the present invention pertains.

The flexible composite hose of the invention has high pressure resistance because the outer tube exerts an inward force to the inner tube due to its heat shrinkage. The heat shrinking can be accomplished simply by passing the double-walled hose assembly through a heating oven. The thin-walled inner tube can be easily produced from polyamide resin or fluoroplastics, and the inner tube can be covered with the outer tube in a few steps by using a small-scale apparatus. The flexible composite hose has good resistance to oil and chemicals which come into contact with both the inside and outside. In addition, it can be made in any length and size desired.

The invention is now described in more detail with reference to the following examples.

EXAMPLE 1

Figure 2:
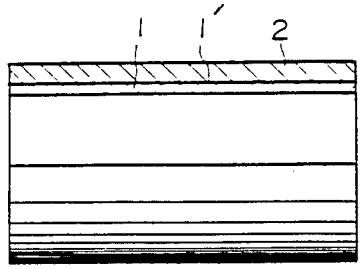
FIG. 2 is a longitudinal sectional view taken along the line A—A in FIG. 1.

An inner tube measuring 10 mm in outside diameter, 0.5 mm thick, and 50 cm long, made of polytetrafluoroethylene ("Teflon"), was covered with an outer tube measuring 12.7 mm in inside diameter, 0.7 mm thick, and 50 cm long, made of crosslinked polyolefin ("Insultite VFP-876"). The tube assembly in the straight form was passed through an electric furnace at 120° to 140° C. at a speed of 1 m/min to effect heat shrinkage. Thus there was obtained a composite hose as shown in FIGS. 1 and 2. The composite hose was flexible and superior in chemical resistance and pressure resistance. It was suitable for alcohol fuel piping.

EXAMPLE 2

An inner tube measuring 4.6 mm in outside diameter, 0.3 mm thick, and 50 cm long, made of polyamide resin (nylon), was covered with an outer tube measuring 6.4 mm in inside diameter, 0.9 mm thick, and 50 cm long, made of chloroprene rubber ("Neoprene"). The tube assembly in the straight form was passed through an electric furnace at 140° to 150° C. at a speed of 0.5 m/min to effect heat shrinkage. Thus there was obtained a composite hose as shown in FIGS. 1 and 2. The composite hose was flexible and superior in heat resistance. It was suitable for fuel piping in the automotive engine room.

EXAMPLE 3

An inner tube measuring 7.0 mm in outside diameter, 0.8 mm thick, and 50 cm long, made of polyamide resin (nylon) and coated with a polyamide adhesive, was covered with an outer tube measuring 9.5 mm in inside diameter, 0.3 mm thick, and 50 cm long, made of polytetrafluoroethylene having perfluoroalkoxy groups on the side chains ("Penntube PFA"). The tube assembly in the straight form was passed through an electric furnace at 160° to 170° C. at a speed of 0.5 m/min to effect heat shrinkage. Thus there was obtained a composite hose which has an adhesive layer interposed between the inner tube and the outer tube as shown in FIG. 3. The composite hose was flexible and had the external surface superior in chemical resistance. It was suitable for air, vacuum, and fuel piping in the automotive engine room where it might be attacked by battery solution (containing sulfuric acid).

What is claimed is:

1. A flexible composite hose having high oil resistance, chemical resistance and pressure resistance which consists essentially of an inner tube that consists of a synthetic polyamide and an outer external tube of heat-shrunk material which consists of a fluoroplastic or chloroprene rubber, said inner tube being compressed by the shrinkage force of said outer external tube.

2. A flexible composite hose as defined in claim 1, wherein the outer external tube is made of polytetrafluoroethylene having perfluoroalkoxy groups.

3. A flexible composite hose as defined in claim 1, wherein the outer external tube is of chloroprene rubber.

* * * * *